United States Patent [19]

Hanson et al.

[11] 4,105,634

[45] Aug. 8, 1978

[54] PRODUCTION OF THERMOSETTING RESINOUS POLYEPOXIDES

[75] Inventors: Harry T. Hanson, Millburn; Marvin Gordon, Succasunna, both of N.J.

[73] Assignee: Celanese Corporation, New York, N.Y.

[21] Appl. No.: 713,622

[22] Filed: Aug. 11, 1976

[51] Int. Cl.² .................................. C08G 59/02
[52] U.S. Cl. .......................... 526/65; 526/66; 528/89; 528/104; 260/823
[58] Field of Search .................... 260/47 EP

[56] References Cited

U.S. PATENT DOCUMENTS

| | | | |
|---|---|---|---|
| 3,306,872 | 2/1967 | Maycock et al. | 260/32.8 |
| 3,336,257 | 8/1967 | Alvey et al. | 260/47 |
| 3,379,684 | 4/1968 | Wiesner et al. | 260/47 |
| 3,477,990 | 11/1969 | Dante et al. | 260/47 |
| 3,824,212 | 7/1974 | Sinnema et al. | 260/47 EP |
| 3,842,037 | 10/1974 | Sinnema | 260/47 EP |
| 3,919,169 | 11/1975 | Ramsey et al. | 260/47 EP |
| 3,931,109 | 1/1976 | Martin | 260/47 EP |
| 3,978,027 | 8/1976 | Marshall | 260/47 EP |

FOREIGN PATENT DOCUMENTS 1,398,197   6/1975   United Kingdom.

*Primary Examiner*—Harold D. Anderson
*Assistant Examiner*—E. A. Nielsen

[57] ABSTRACT

In one aspect, thermosetting liquid resinous polyepoxides are upgraded or advanced in molecular weight by a process including (A) providing a catalyst-free mixture of a dihydric phenol, preferably bisphenol-A and a liquid resinous polyepoxide containing 1,2-epoxy groups, preferably a low molecular weight epoxy resin consisting essentially of the diglycidyl ether of bisphenol-A, at a temperature above about a minimum reaction temperature for a catalytic liquid upgrade reaction between the dihydric phenol and the polyepoxide; and (B) subsequently introducing the catlyst, preferably an organic phosphine and most preferably triphenylphosphine, into the mixture of the dihydric phenol and polyepoxide at reaction temperature and maintaining the mixture containing the catalyst at reaction temperature for a time sufficient to produce the upgraded version of the thermosetting resinous polyepoxide. In another aspect, multiple catalyst additions are featured wherein, for example, after a first catalytic amount of a catalyst is introduced into the mixture of dihydric phenol and polyepoxide and the reaction has been maintained for a first period of time, a second catalytic amount of the catalyst is introduced into the mixture while at reaction temperature to upgrade further the polyepoxide. In yet another aspect of the disclosure, thermosetting resinous polyepoxides of improved molecular weight distribution are obtained by a process, preferably a continuous process, which involves (A) providing a catalyst-free mixture of bisphenol-A and a liquid resinous polyepoxide consisting essentially of an aromatic polyepoxide of the structural formula:

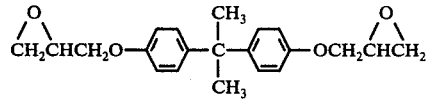

to a temperature between 120° C and about 200° C; and (B) subsequently introducing triphenylphosphine into the mixture of the dihydric phenol and aromatic polyepoxide at a reaction temperature above 120° C and maintaining the mixture containing the catalyst at reaction temperature for a time between about 5 and about 30 minutes.

12 Claims, 2 Drawing Figures

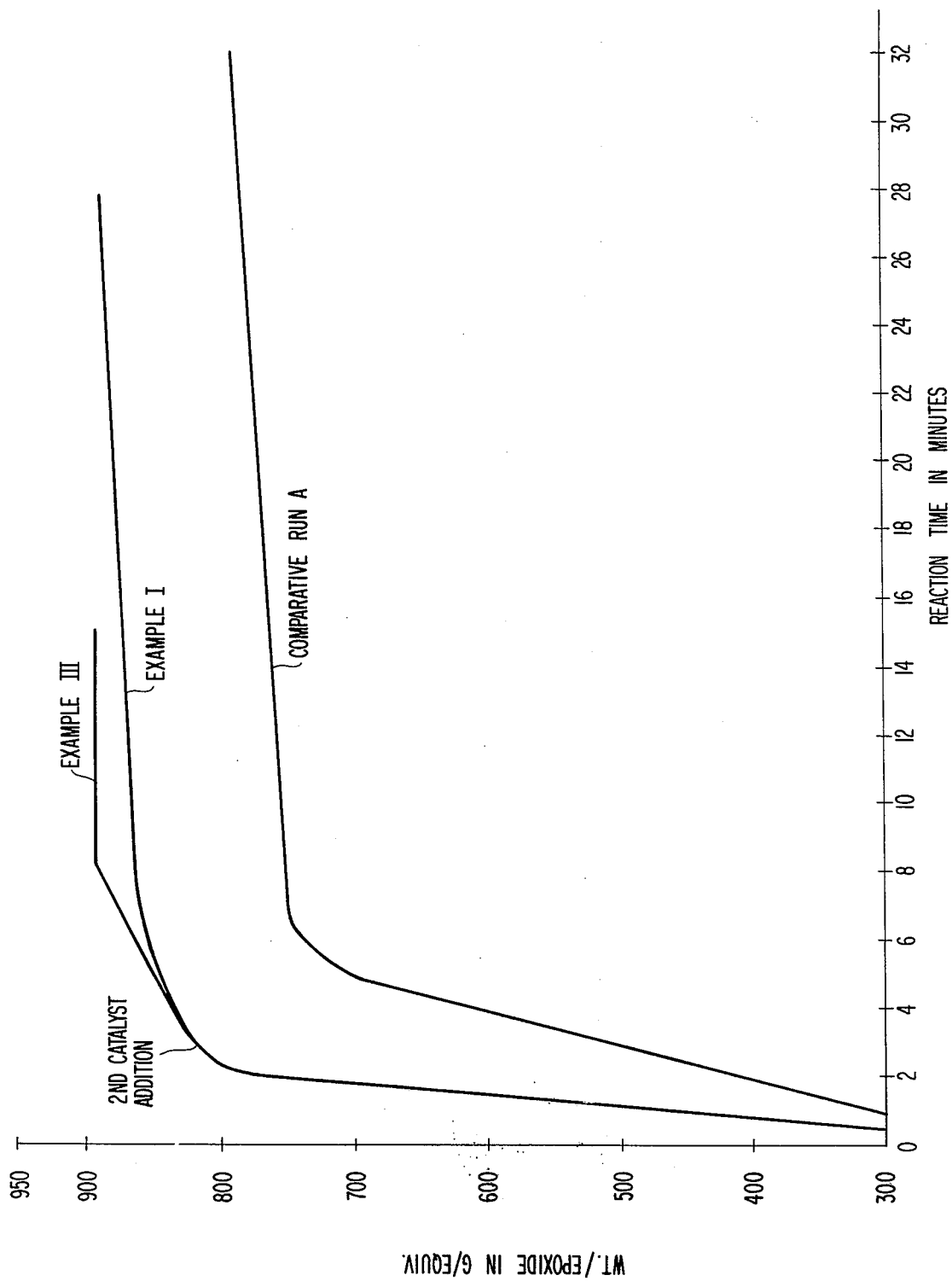

PRODUCTION OF THERMOSETTING RESINOUS POLYEPOXIDES

BACKGROUND OF THE INVENTION

1. Field of the Invention

This invention relates to improvements in the production of thermosetting resinous polyepoxides, including processes and products resulting therefrom.

2. Summary of the Prior Art

Since their discovery, thermosetting resinous polyepoxides, i.e., epoxy resins, have in industries and scientific disciplines found application in many forms, principally as surface-coating materials combining toughness, flexibility, adhesion and chemical resistance to a nearly unparalleled degree.

The epoxy resins are fundamentally polyethers, but retain their epoxy nomenclature on the basis of their starting material and the presence of epoxide groups in the polymer before crosslinking or curing. The most common types of resinous polyepoxides are produced by reaction of monomeric epoxy compounds, chiefly epichlorohydrin, with dihydric phenols, chiefly bisphenol-A, to give diglycidyl ethers.

Depending upon molecular weight, the resinous polyepoxide may vary from a viscous liquid to a high melting solid. The higher molecular weight resinous polyepoxides can be made by a process known as "upgrading" or "advancement". In such an upgrading or advancement process, an initial liquid resinous polyepoxide is reacted with a dihydric phenol in the presence of a catalyst until enough of the dihydric phenol is incorporated into the epoxy polymer chain to increase molecular weight to the desired level.

Such upgrading processes have in the past been conducted both on a batch basis and on a continuous basis. See, for example, U.S. Pat. Nos. 3,547,881 and 3,919,169. In such known batch and continuous upgrading processes, the dihydric phenols and liquid polyepoxide together with a catalyst are admixed or otherwise contacted at a relatively low temperature and then heated up to the reaction temperature and held at reaction temperature for a time sufficient to produce the resinous polyepoxide of higher molecular weight.

In such known batch and continuous upgrading processes, however, cycle times are typically relatively lengthy. For example, batch reactions involving bisphenol-A and a liquid polyepoxide consisting essentially of the diglycidyl ether of bisphenol-A can take from about 10 to about 20 hours for the reaction to be completed. The continuous process described in U.S. Pat. No. 3,919,169 involves a shorter time on the order of about 2 hours, but in a continuous process it would be highly advantageous if the reaction time could be shortened significantly below this level.

In addition to economies of time, such long cycle or reaction times can lead to a relatively wide molecular weight distribution which may in turn lead to end use disadvantages. For example, surface coating imperfections or "orange peel" has been observed when molecular weight distribution and concomitant viscosity characteristics are not properly controlled.

SUMMARY OF THE INVENTION

Accordingly, a primary object of the present invention is to provide improvements in the production of thermosetting resinous polyepoxides, which improvements significantly alleviate or do not incur the problems and disadvantages discussed above. Other and more particular objects of the present invention will become apparent to one skilled in the art from the following summary of the invention and description of the preferred embodiments:

In accordance with one aspect of the present invention, a process is provided for upgrading or advancing the molecular weight of thermosetting resinous polyepoxides, which process involves:

(A) providing a catalyst-free mixture of a dihydric phenol and a resinous polyepoxide containing 1,2-epoxy groups at a temperature above about a minimum reaction temperature for a catalytic liquid upgrade reaction between the dihydric phenol and the polyepoxide; and (B) subsequently introducing the catalyst into the mixture of the dihydric phenol and polyepoxide at reaction temperature and maintaining the mixture containing the catalyst at reaction temperature for a time sufficient to produce an upgraded thermosetting resinous polyepoxide.

In accordance with another more particular aspect of the present invention, a process is provided for upgrading thermosetting liquid resinous polyepoxides, which process consists essentially of the sequential steps of:

(A) heating under agitation a catalyst-free mixture of bisphenol-A and a liquid resinous polyepoxide consisting essentially of a polyepoxide of the structural formula:

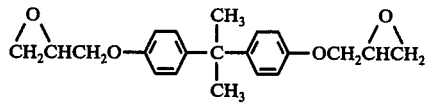

to a reaction temperature above 120° C and for a time sufficient to obtain a substantially homogenous solution wherein the bisphenol-A is substantially completely dissolved; and (B) admixing the solution at a reaction temperature above 120° C with a catalytic amount of triphenylphosphine and maintaining the admixture at reaction temperature for a time sufficient to produce an upgraded thermosetting resinous polyepoxide consisting essentially of a polyepoxide of the structural formula:

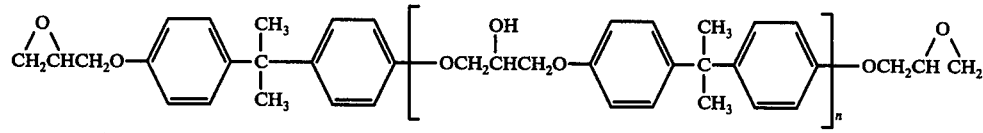

wherein $n$ has an average value between about 4 and about 6.

A central feature of the above-noted aspects of the present invention is the discovery that if a catalyst such as triphenylphosphine is withheld or not introduced into the reaction mixture of resinous polyepoxide and a dihydric phenol such as bisphenol-A until the reaction mixture has been raised to reaction temperature, the reaction will occur at a significantly greater rate and therefore may be completed to the desired extent in a significantly shorter reaction time than if the same amount of catalyst is preheated with the reactants. While not wishing to be bound by any theory underlying the present invention, it is presently believed that heretofore catalysts have been deactivated to a certain degree whenever they have been admixed with the reactants, either singularly or together, at a temperature lower than the minimum temperature needed for initiation of the reaction. This is indeed surprising for U.S. Pat. No. 3,919,169, for example, teaches that preheating of a mixture of the catalyst and the reactants below the reaction temperature is allegedly highly desirable.

In another aspect of the present invention, such advancement or upgrade reactions are subjected to multiple catalyst addition. For example, after a first catalytic amount of the catalyst is introduced into the mixture of the dihydric phenol and the liquid resinous aromatic polyepoxide and the reaction has been maintained for a first period of time, a second catalytic amount of the catalyst is introduced into the mixture while at reaction temperature to upgrade further the polyepoxide. Similarly, third, fourth and yet additional catalyst additions may be made. Such multiple catalyst additions have been found to increase not only the rate of reaction, but also the extent of reaction between the dihydric phenol and the initial or starting resinous polyepoxide.

In yet another aspect of the present invention, a process is provided for upgrading thermosetting liquid resinous polyepoxides, the process including:

(A) providing a catalyst-free mixture of bisphenol-A and a liquid resinous polyepoxide consisting essentially of a polyepoxide of the structural formula:

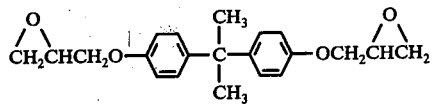

at a reaction temperature above about 160° C, and (B) thereafter admixing triphenylphosphine with the mixture of bisphenol-A and the polyepoxide and maintaining the mixture containing the catalyst at reaction temperature above 160° C for a time between about 5 and 30 minutes and sufficient to produce an upgraded thermosetting resinous polyepoxide consisting essentially of an aromatic polyepoxide of the structural formula:

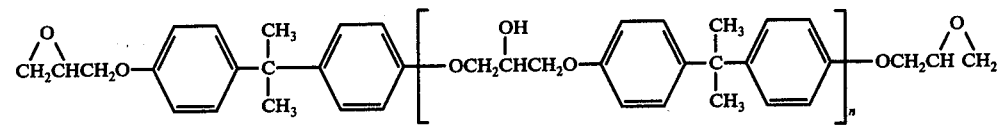

wherein $n$ has an average value between about 4 and about 6, and wherein the resinous polyepoxide has a weight per epoxide value of between about 600 and about 1000 and a molecular weight distribution value between about 1.6 and about 1.9.

In yet another aspect of the present invention, a continuous process is provided for upgrading thermosetting liquid resinous polyepoxides, which process consists essentially of:

(A) passing catalyst-free bisphenol-A through a first zone to heat the bisphenol-A to a temperature between about 160° C and 180° C, the bisphenol-A being in a molten state upon emerging from the first zone;

(B) passing catalyst-free liquid resinous polyepoxide consisting essentially of a polyepoxide of the structural formula:

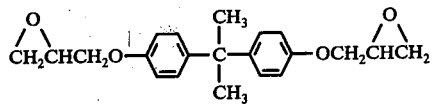

through a second zone to heat the liquid resinous polyepoxide to a temperature between 120° C and about 180° C;

(C) in a third zone downstream of the first and second zones, admixing the bisphenol-A and the liquid resinous polyepoxide to provide a catalyst-free mixture of bisphenol-A and the polyepoxide at a temperature between 120° C and about 200° C (D) in a fourth zone downstream of the third zone, admixing the solution at a reaction temperature between about 120° C and 200° C with a catalytic amount of triphenylphosphine and maintaining the admixture at a reaction temperature between 120° C and about 250° C, preferably between about 160° C and 240° C, for a time between about 5 and about 30 minutes and sufficient to produce an upgraded thermosetting resinous polyepoxide consisting essentially of a polyepoxide of the structural formula

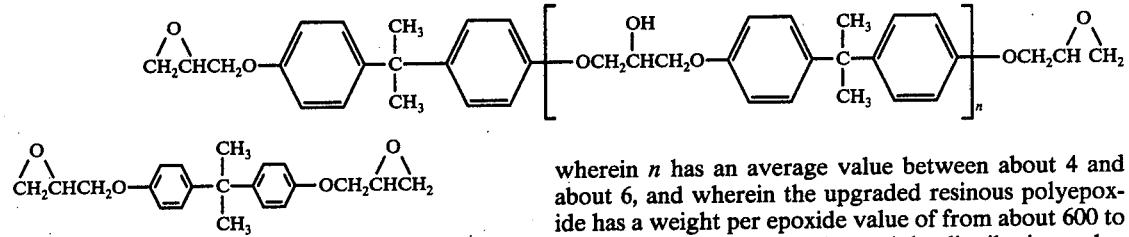

wherein $n$ has an average value between about 4 and about 6, and wherein the upgraded resinous polyepoxide has a weight per epoxide value of from about 600 to about 1000 and a molecular weight distribution value between about 1.6 and about 1.9.

In the last two of the above-noted aspects of the present invention, a central feature is that the increased rate of reaction and concomitant relatively short reaction or cycle time leads to the production of a resinous polyepoxide of a relatively narrow molecular weight distribution. This molecular weight distribution in turn may provide enhanced utility for many applications. For example, the improved molecular weight distribution typically leads to better flow characteristics and elimination of any "orange peel" effects in the coating surface.

Other aspects and advantages of the present invention will become apparent to one skilled in the art in view of the above and the following description of the preferred embodiments when read in conjunction with the accompanying drawings.

BRIEF DESCRIPTION OF THE DRAWINGS

FIG. 2 is a graph of weight per epoxide equivalent versus reaction time and depicting a comparison of processes according to the present invention utilizing multiple catalyst additions and utilizing only a single catalyst addition, and a process in accordance with the prior art.

DESCRIPTION OF THE PREFERRED EMBODIMENTS

Figure 1:
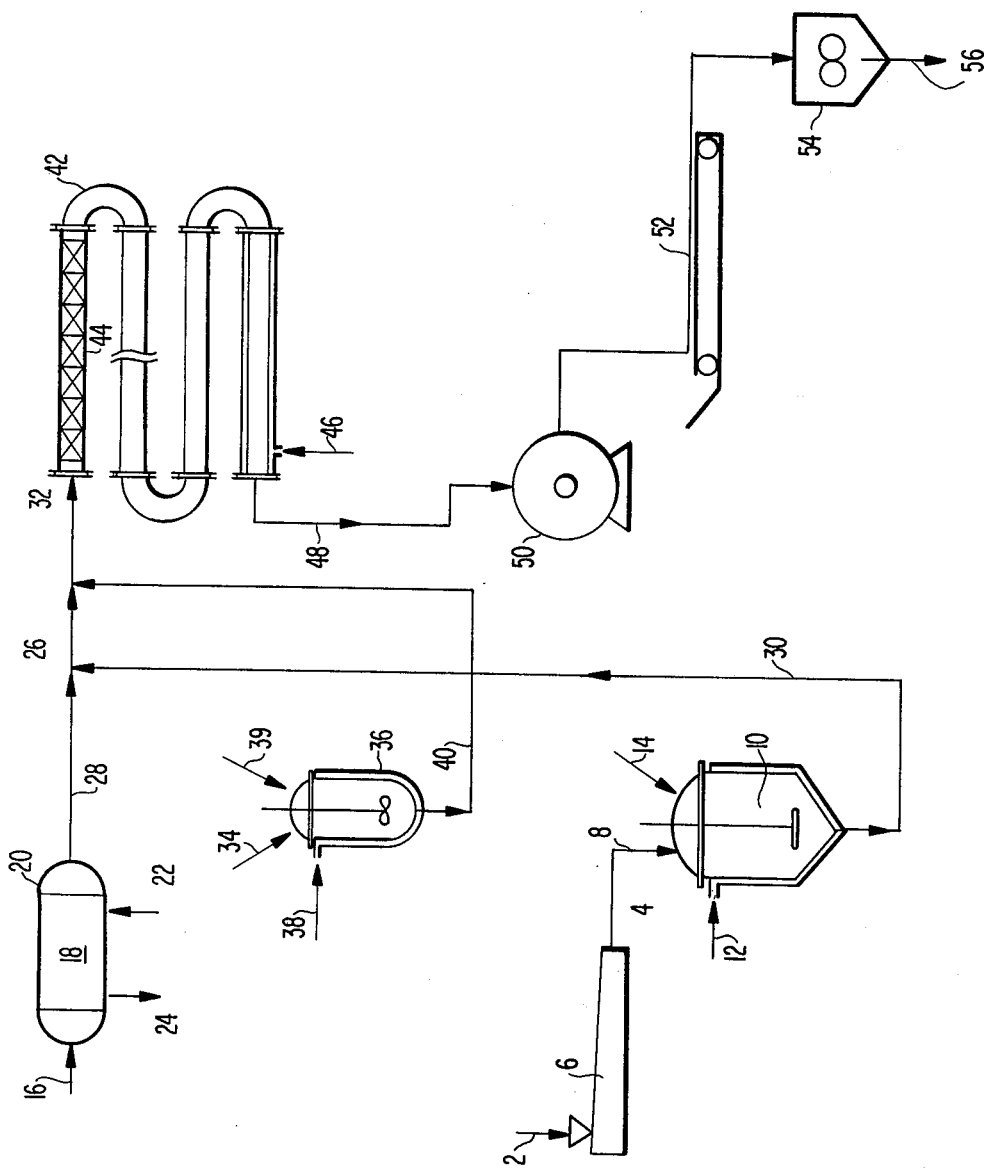
FIG. 1 is a schematic flow chart representation for a continuous process according to the present invention.

As indicated above, a dihydric phenol is reacted with a thermosetting resinous polyepoxide to produce the upgraded or advanced resinous polyepoxide of higher molecular weight than the initial resinous polyepoxide.

In general, any dihydric phenol may be used. For example, suitable dihydric phenols may be represented by the structural formulas

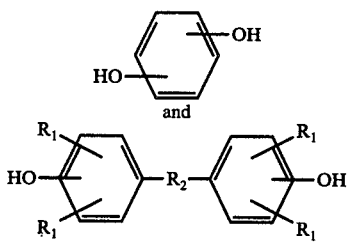

wherein $R_1$ may independently be selected from the group consisting of hydrogen, lower alkyl, chlorine and bromine, and wherein $R_2$ may be selected from the group consisting of a divalent bond, a divalent hydrocarbon radical of from 1 to 10 carbon atoms,

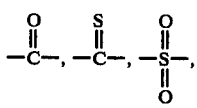

—S—, —S—S— and —O—.

Non-limiting examples of such dihydric phenols include bisphenol-A, bisphenol-ACP, bisphenol-L, bisphenol-V, dichlorobisphenol-A, tetrachlorobisphenol-A, tetrabromobisphenol-A, resorcinol, hydroquinone, 2,2-bis(4-hydroxyphenyl) pentane, 2,2-bis(4-hydroxyphenyl) pentanoic acid, 2,2-bis(4-hydroxyphenyl)sulfone, 2,2-bis(4-hydroxyphenyl)methane, bis(3-allyl-4-hydroxyphenyl)propane, 2,2-bis(3-isobutyl-4-hydroxyphenyl)pentane, as well as

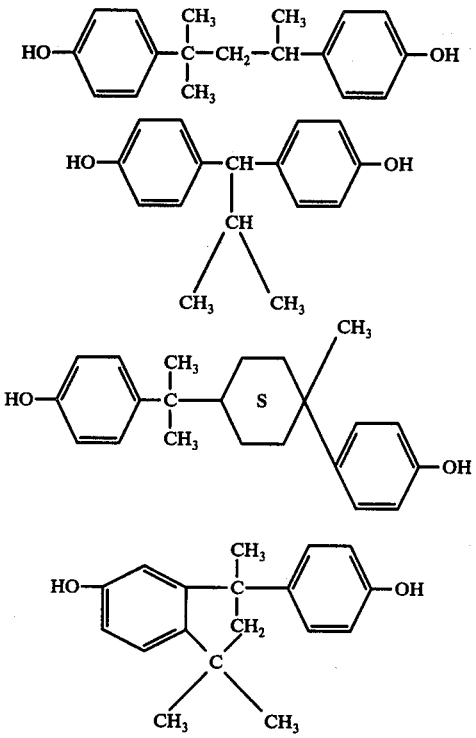

and

Bisphenol-A is the most preferred dihydric phenol because of its ready reactivity, polyaromatic nucleus structure, and its wide availability.

In general, any thermosetting resinous polyepoxide containing at least two 1,2-epoxy groups may be upgraded or advanced in molecular weight by reaction with at least one of the above-noted dihydric phenols. Such resinous polyepoxides may be of the structural formula

wherein $R_3$ is a divalent aliphatic, cycloaliphatic, heterocyclic or aromatic radical. Generally, such resinous polyepoxides are characterized by weight per epoxide equivalent values which may range up to about 2,000, and more typically is between about 100 and about 1,000.

Non-limiting examples of such resinous polyepoxides may be found in "New Linear Polymers", Lee, Stoffey and Neville (1967 McGraw-Hill); "Handbook of Epoxy Resins", Lee and Neville (McGraw-Hill 1967); and U.S. Pat. Nos. 2,615,007; 2,615,008; 3,325,452; 3,334,068 and 3,352,825, all of which are incorporated herein by reference for purposes of brevity and clarity.

More preferably, the starting thermosetting resinous polyepoxides consist essentially of polyepoxides of the structural formula

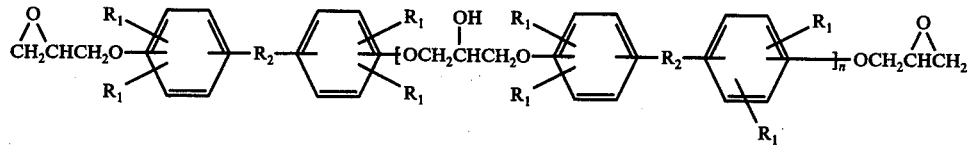

wherein $R_1$ and $R_2$ may independently be selected from their respective groups given earlier above and where $n$ varies between zero and a small number less than about 10. When $R_1$ is H, $R_2$ is

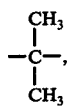

and $n$ is essentially zero, the resin is a very fluid light colored material which is essentially the diglycidyl ether of bisphenol-A.

As indicated above, these polyepoxides may also be characterized by weight per epoxide equivalent values. Weight per epoxide equivalent or "WPE" is defined and used herein to indicate the grams of resinous polyepoxide containing one gram equivalent of epoxy groups. Weight per epoxide equivalent is determined hereby by the procedures described in "Epoxy Resins", pp. 133–135, Burge, Jr. and Geyer, *Analytical Chemistry of Polymers*, Part I, Kline, Ed. (Interscience 1959), except that potassium acid phthalate was employed to standardize the acid solution, and except that chlorobenzene/chloroform 8/5, V/V, was used as the resin solvent (this procedure is incorporated hereby by reference for purposes of brevity).

As the molecular weight and weight per epoxide equivalent value increase so generally does the viscosity of these resinous polyepoxides. Accordingly, particularly preferred liquid resinous polyepoxides generally possess an $n$ value averaging less than about 1, i.e., a liquid resinous polyepoxide consisting essentially of the diglycidyl ether of bisphenol-A having the structural formula

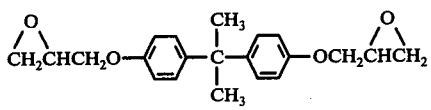

Such a polyepoxide may have a weight per epoxide equivalent value between about 180 and about 240. The term "liquid" means that the initial polyepoxide is in the liquid state at ambient conditions, i.e., 25° C and 760 mmHg.

The catalyst may be any compound or mixture of compounds which will catalyze the reaction between the hydroxy group of the bisphenol-A and the epoxy group of the initial polyepoxide. Such catalysts may be organic or inorganic, or a combination of both. Non-limiting examples of organic catalysts include the organic phosphines of the formula

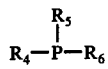

wherein $R_4$ is an organic radical and $R_5$ and $R_6$ are independently selected from hydrogen and organic radicals. Such organic radicals may be hydrocarbon or substituted hydrocarbon radicals of from one to about twenty carbon atoms. Non-limiting examples of such phosphines include triphenylphosphine, tri-p-tolylphosphine, tris-p-chlorophenylphosphine, tri-n-butylphosphine, dibutylallylphosphine, trilaurylphosphine, trihexenylphosphine, tridodecylphosphine, dicyclohexylphosphine, trinaphthylphosphine, triethoxybutylphosphine, tris-p-methoxyphenylphosphine, tris-p-fluorophenylphosphine, and

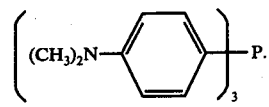

Other catalysts include tertiary amines, e.g., trioctylamine and tributylamine; organic ammonium compounds such as benzyl trimethylammonium chloride; organic phosphonium compounds such as ethyltriphenyl phosphonium iodide and ethyltriphenyl phosphonium acetate acid complex. Inorganic catalysts include alkali metal hydroxides, e.g., potassium hydroxide and ether complexes thereof, alkali metal iodides, e.g., potassium iodide. Mixed catalyst systems may also be used. Others will be evident to one skilled in the art from the disclosure herein.

The catalyst may be present in the reaction mixture in any suitable catalytic amount as will be evident to one skilled in the art from the present specification. For example, catalyst may be present in an amount of from 0.001 to 10%, more typically from about 0.01 to 5%, and preferably from about 0.05 to 1%, based on the weight of dihydric phenol and polyepoxide reactants.

The amount of dihydric phenol and initial resinous polyepoxide to be employed in the process may vary over a wide range depending upon the type of reactants and the type of product to be desired. For example, the dihydric phenol and the polyepoxide reactants may be used in equivalency ratios of phenolic (Ar—OH) to epoxide groups

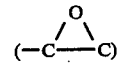

of from about 0.1:1 up to 1:1, more typically from about 0.2 to 0.95:1, and preferably from about 0.5 to 0.90:1.

As indicated above in the summary of the present invention, the dihydric phenol and the initial resinous polyepoxide are heated separately or together and provided as a catalyst-free mixture at a temperature above about a minimum or initial reaction temperature for a catalytic liquid upgrade reaction between the dihydric phenol and the polyepoxide.

More particularly, the dihydric phenol and the resinous polyepoxide may be separately heated to the minimum reaction temperature and then contacted or admixed together to form the catalyst-free mixture at a temperature above the minimum reaction temperature, or the dihydric phenol and resinous polyepoxide may be admixed at a lower temperature, and the catalyst-free admixture heated to a temperature of above about that of the minimum reaction temperature.

The minimum or initial reaction temperature is defined herein as that minimum or initial temperature at which in the presence of a catalyst the dihydric phenol and initial resinous polyepoxide begin to react exothermally. Once the exothermic reaction is initiated, in the absence of cooling the reaction mixture will rise in temperature. Minimum or initial reaction temperatures for various systems of specific dihydric phenols, resinous polyepoxides and catalysts are known to those skilled in this art. If the minimum or initiating reaction temperature is not known for a particular system of dihydric phenol, resinous polyepoxide and catalyst, then the minimum or initiating reaction temperature may be conveniently determined by mixing small amounts of the dihydric phenol and polyepoxide together with the catalyst and then heating the mixture slowly until the initial reaction exotherm is detected.

It may be noted at this point that the term "catalyst-free mixture" means a mixture of dihydric phenol and resinous polyepoxide which contains no appreciable amounts of catalyst such that the reaction would, in the absence of additional catalyst, begin to react exothermically at a temperature of above about that of the minimum reaction temperature.

Once the catalyst-free mixture of dihydric phenol and resinous polyepoxide has been provided at the temperature of above about that of the minimum reaction temperature, the catalyst may then be introduced into the mixture of the dihydric phenol and polyepoxide. If desired, such introduction of the catalyst may be substantially instantaneous with the mixing of the dihydric phenol and the polyepoxide. As indicated above, however, if the catalyst is added to the dihydric phenol and polyepoxide prior to heating to reaction temperature, at least some of the catalyst will be deactivated and the rate and perhaps extent of reaction will be adversely affected.

Once the catalyst has been introduced or admixed into the reactant mixture of dihydric phenol and polyepoxide, the admixture containing the catalyst is then maintained at reaction temperature for a time sufficient to produce an upgraded resinous polyepoxide of the desired molecular weight. This maintenance or holding time for the reactant mixture will vary depending upon the dihydric phenol, polyepoxide and catalyst used, as well as the level of reaction temperature chosen.

Conveniently, upon addition of the catalyst the reaction mixture is allowed to exothermally rise in temperature, and after such an exothermic rise the temperature need only be maintained above the minimum or initial reaction temperature.

For example, in the case of bisphenol-A and an initial liquid resinous polyepoxide consisting essentially of the diglycidyl ether of bisphenol-A and triphenylphosphine as a catalyst, minimum or initial reaction temperature is slightly above 120° C, e.g., 125°–130° C. Once this reaction is initiated, the temperature of the reaction mixture will typically rise over a period of about one to ten minutes to a maximum range of about 220° to 250° C, and then the reaction temperature may be allowed to fall somewhat, e.g., to between about 150° C and about 220° C for the remainder of the reaction period.

The reaction may be maintained, i.e., the polyepoxide may be allowed to increase in molecular weight and weight per epoxide equivalent, for a period of time sufficient to produce the thermosetting polyepoxide upgraded or advanced to the desired molecular weight and weight per epoxide equivalent. For example, when the final product has the structural formula

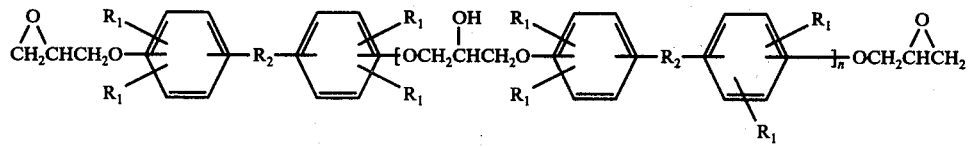

where $R_1$ and $R_2$ have the meaning given above, the average value of $n$ may be allowed to increase by at least about 2, and preferably by about 4 to 6, from its initial value.

The reaction may be carried out in any convenient stirred or non-stirred reactor. Preferably, the reaction is conducted under agitation for at least part of the total reaction time to ensure a substantially homogeneous reaction mixture or solution.

As indicated above, another aspect of the present invention involves multiple catalyst addition. In other words, after a first catalytic amount of the catalyst is introduced into the mixture of dihydric phenol and the polyepoxide and the reaction has been maintained for a first period of time, further catalytic amounts of the catalyst may be introduced into the mixture while at reaction temperature to upgrade further the polyepoxide. Such additional increments of catalyst introduced during the reaction have been found unexpectedly to both increase the rate of reaction as well as the extent of reaction. Ratios of such catalyst increments may vary over a wide range, e.g., between about 1:10 to 10:1, more typically between about 2:1 to about 1:2.

As indicated above, it may be desired to control or affect molecular weight distribution in the resulting epoxy resin product. For the preferred starting reactants, bisphenol-A and polyepoxide consisting essentially of diglycidyl ether of bisphenol-A, this process typically involves (A) providing a catalyst-free mixture of bisphenol-A and a liquid resinous polyepoxide consisting essentially of a polyepoxide of the structural formula:

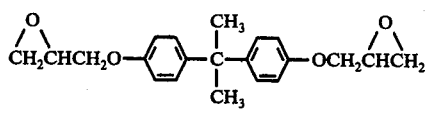

at a reaction temperature above about 160° C, typically less than about 250° C, preferably between 160° and 180° C; and (B) thereafter admixing triphenylphosphine with the mixture of bisphenol-A and the polyepoxide and maintaining the mixture containing the catalyst at a reaction temperature above 160° C for a time between about 5 and 30 minutes and sufficient to produce an upgraded thermosetting resinous polyepoxide consisting essentially of an aromatic polyepoxide of the structural formula

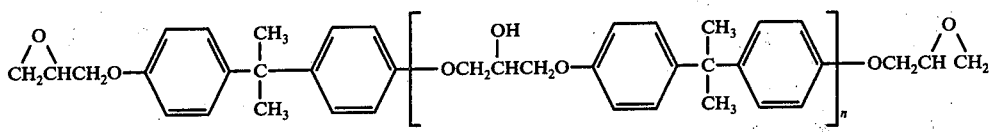

wherein n has an average value between about 2 and about 8, more typically between about 4 and about 6, and wherein the resinous polyepoxide has a weight per epoxide value of between about 500 and 2000, more typically between 700 and about 1000, and a molecular weight distribution value between about 1.6 and about 1.9.

This particular process takes advantage of the discovery of the increased rate of reaction and controls or improves molecular weight distribution (MWD) and concomitant viscosity in the resulting thermosetting polyepoxide product. More particularly, since molecular weight distribution increases with increasing time in the reaction mixture, the increased rate of reaction (i.e., increased rate of increase of weight per epoxide equivalent) allows a significantly shorter overall reaction time to produce a polyepoxide of the desired final weight per epoxide equivalent and final MWD value or viscosity value. This can lead to improved coating and curing characteristics, including elimination or at least significant alleviation of "orange peel" effects.

Molecular weight distribution or "MWD" values are defined herein as the ratio of weight averaged molecular weight to number averaged molecular weight. (These molecular weight values may be determined from corresponding polystyrene Angstrom equivalents obtained by known gel permeation chromotography techniques.)

The reaction between the dihydric phenol and the initial resinous polyepoxide is typically conducted in a melt or molten solution in the absence of an added solvent or diluent. If desired, however, a diluent or solvent may be added. Preferably, any such diluent or solvent has a normal boiling point greater than 110° C. Examples of such solvents or diluents include inert organic liquids such as ketones, e.g., 4-methyl-2-pentanone; aromatic hydrocarbons, e.g., xylenes; aliphatic hydrocarbons, e.g., octane; cycloaliphatic hydrocarbons, e.g., decalin; ethers, e.g., diphenyl ether and 1,2-bis(2-methoxyethoxy)ethane.

The processes of the present invention may be conducted on a batch, semi-continuous or continuous basis.

If conducted on a continuous basis, the process of the present invention preferably involves (referring to FIG. 1) passing the catalyst-free bisphenol-A from an inlet feed line 2 through a first zone 4 to heat the bisphenol-A to a temperature between about 160° and 180° C, the bisphenol-A being in a molten or liquid state upon emerging from the first zone 4. The first zone may comprise a heated axial feeder 6 connected to a line 8 and a heated holding tank 10. Heated fluid may be supplied through a line 12 to heat or maintain the bisphenol-A at the desired temperature by means of a conventional heat exchanger relationship. Nitrogen or other inert gas may be supplied through a line 14 to the interior of the tank 10 so as to maintain an inert atmosphere about the molten bisphenol-A.

Catalyst-free liquid resinous polyepoxide consisting essentially of a polyepoxide of the structural formula

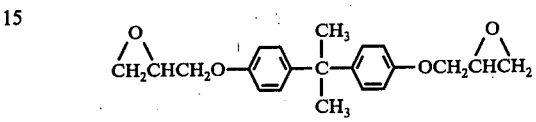

from inlet feed line 16 may be passed through a second zone 18 to heat the liquid resinous polyepoxide to a temperature between 120° C and about 200° C, preferably between about 160° and 180° C. The second zone 18 may comprise a heat exchanger 20 heated by a fluid circulating through lines 22 and 24.

In a third zone 26 downstream of the first and second zones, bisphenol-A from the first zone 4 via line 30 and the liquid resinous polyepoxide from the second zone 18 via line 28 are contacted or admixed to provide a catalyst-free mixture of bisphenol-A and the polyepoxide at a temperature between 120° and 200° C, preferably between about 160° and 180° C.

In a fourth zone 32 downstream of the third zone 26, the mixture or solution of bisphenol-A and polyepoxide is contacted or admixed at a reaction temperature between 120° and 200° C, preferably between about 160° and 180° C with a catalytic amount of triphenylphosphine. The triphenylphosphine may be provided via an inlet line 34 to an agitated tank 36 which may be heated by means of a steam line 38 to a temperature of between about 85° and 150° C. Nitrogen or other inert gas may be supplied to tank 36 via line 39 to maintain a blanket about the heated catalyst. From tank 36 the catalyst may be fed via line 40 to the initial contacting or mixing zone 32. In zone 32 a tubular reactor 42 equipped with in-line mixers or agitators 44 may ve provided to maintain the reaction mixture of bisphenol-A, polyepoxide and catalyst under agitation at a reaction temperature between 120° C and about 250° C, preferably between about 160° and 240° C, for a time between about 5 minutes and about 30 minutes, and sufficient to produce an upgraded thermosetting resinous polyepoxide product consisting essentially of a polyepoxide of the structural formula

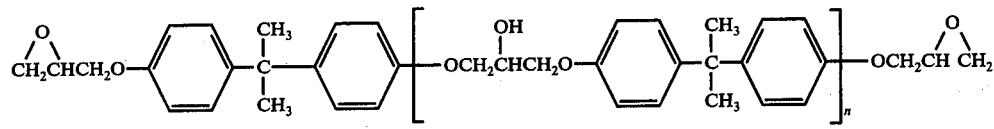

wherein n has an average value between about 4 and about 6, and wherein the upgraded resinous polyepoxide has a weight per epoxide value of from about 600 to about 1000 and a molecular weight distribution value between about 1.6 and about 1.9. A conventional heating fluid may be provided via a line 46 and about the tubular reactor 42 to maintain the desired reaction temperature. From tubular reactor 42, the upgraded polyepoxide product may be recovered via a line 48, a vacuum evaporator 50, and then to a conventional water-chilled belt-cooler 52 for solidification and to a grinder 54 for subdividing the solid product into chips or granules of a desired size. From the grinder 54 the polyepoxide product may be passed to a packaging zone 56.

The products of the present invention are terminated in 1,2-epoxy groups and are thus thermosetting, and can be cured with a wide variety of curing systems as known to those skilled in the art. The reactive epoxide and also hydroxyl groups are the points of reaction with curing agents and modifying resins. Numerous organic nitrogen compounds have been investigated for use as epoxy resin curing agents, and the amines, both aliphatic and aromatic, are the most useful. See, for example, "Polymers and Resins", Golding, pages 355–360 (Van Nostrand 1959); "Textbook of Polymer Science", Billmeyer, Jr., pages 478–480 (2nd Ed., Wiley-Interscience 1962), and "Handbook of Epoxy Resins", Lee and Neville (McGraw-Hill 1967), all of which are herein incorporated by reference for purposes of brevity and clarity of the present invention.

The polyepoxides produced according to the present invention are useful in many applications, principally as surface-coating materials which typically exhibit toughness, flexibility, adhesion and chemical resistance.

The present invention is further illustrated by the following specific examples. All parts ratios and percentages in the examples and in other parts of the specification and claims are by weight unless otherwise indicated.

EXAMPLE I 33.4 parts molten bisphenol-A were combined with 75.8 parts of a liquid resinous polyepoxide consisting essentially of the diglycidyl ether of bisphenol-A (Epi-Rez 510) having a WPE of 190 and mixed thoroughly while the melt temperature was adjusted to 172° C as the initial reaction initiation temperature. Then 0.1 part triphenylphosphine was added with continued stirring. An immediate exotherm occurred which reached its peak value of 244° C in 1.8 min. Stirring was continued an additional 25 min. when the temperature had smoothly decreased to 207° C. The resulting upgraded polyepoxide resin had the properties shown in Table I below.

EXAMPLE II

Example I was repeated except the initial reaction initiation temperature was 130° C. A peak exotherm of 190° C was observed in 10 min. and the total reaction time was 62 min. Properties of the resulting resin are shown in Table I below. Samples were periodically withdrawn throughout the run.

EXAMPLE III

Example I was repeated except that a second 0.1 part triphenylphosphine was added to the reaction 4 minutes after the first addition. The initial peak exotherm of 244° C was observed after 1.9 minutes. A second mild exotherm of from 227 to 231° C was observed immediately after second addition of catalyst. Reaction was stirred 13 minutes after second catalyst addition. Properties of the resulting resin are shown in Table I below. Samples were periodically withdrawn throughout the run, WPE values determined, and plotted as shown in FIG. 2.

COMPARATIVE RUN A 33.4 parts bisphenol-A, 75.8 parts of a liquid resinous polyepoxide consisting essentially of the diglycidyl ether of bisphenol-A (Epi-Rez 510) and 0.1 part triphenylphosphine were charged at room temperature (about 25° C). With stirring and heating, the temperature was raised to 140° C where a clear solution was obtained in sixteen minutes. An exotherm began which reached its peak value of 212° C in an additional 5 minutes. Stirring was continued an additional 27 minutes during which the temperature smoothly decreased to 192° C. The resulting resin had the properties shown in Table I below. Samples were periodically withdrawn throughout the run, WPE values determined, and plotted as shown in FIG. 2.

COMPARATIVE RUN B

All times based on phosphine addition as zero time. 33.4 parts bisphenol-A and 75.8 parts of a liquid resinous polyepoxide consisting essentially of the diglycidyl ether of bisphenol-A (Epi-Rez 510) were combined at room temperature and heated and stirred until a clear melt was obtained with a temperature of 111° C. Then 0.1 part triphenylphosphine was charged and gentle heating begun such that after 6 minutes the temperature was 115° C. Heating was continued such that the temperature was 135° C after 14 minutes. After 19 minutes, temperature 162° C, and exotherm was easily detected which maximized at 184° C after 22 minutes. The temperature was 159° ± 3° C from 52 to 68 min. at which point external heating slowly began to raise the temperature such that it was 174° C after 93 minutes and 186° C at 120 minutes. Properties of the resulting resin were WPE 1040; MWD 2.1; An 87.7; Aw 189; melt viscosity at 150° C, 115 poise. Samples were periodically withdrawn throughout the run.

COMPARATIVE RUN C

Example I was repeated except that the triphenyl phosphine was added to the solid bisphenol-A and then the mixture melted over the time of 5 hours (T = 160° C) before combination with the liquid resinous polyepoxide consisting essentially of the diglycidyl ether of bisphenol-A (Epi-Rez 510). Initial temperature of mixed reactants was 165° C. A peak exotherm of 218° C was reached 3.3 min. after addition. The addition was stirred for 21 minutes after peak exotherm during which time the temperature decreased to 198° C. Properties are shown in Table I below. Samples were periodically withdrawn throughout the run.

TABLE I

| Example/Comp. Run | I | II | III | A | B | C |
|---|---|---|---|---|---|---|
| Initiation Temp. (° C) | 172 | 130 | 172 | 156 | 160 | 165 |
| Total Run Time (Min.) | 27 | 62 | 17 | 32 | 126 | 31 |
| Peak Exotherm | 243 | 190 | 244 | 212 | 184 | 225 |
| Target WPD | 1025 | 1025 | 1025 | 1025 | 1025 | 1025 |
| Final WPE | 880 | 1017 | 892 | 774 | 1040 | 783 |
| Aw | 123 | 155 | 128 | 121 | 189 | 106 |

TABLE I-continued

| Example/Comp. Run | I | II | III | A | B | C |
|---|---|---|---|---|---|---|
| An | 73.9 | 81.6 | 74.6 | 71.8 | 87.7 | 65.6 |
| MWD (Aw/An) | 1.7 | 1.9 | 1.7 | 1.7 | 2.1 | 1.6 |
| Viscosity (poise at 150° C) | 34 | 63 | n.a. | 26 | 115 | 24 |

EXAMPLE IV

A continuous apparatus line, similar in design to the schematic shown in FIG. 1, was used to conduct continuous runs IV-a through IV-g. In Example IV-a, a diglycidyl ether of bisphenol-A (Epi-Rez 510) with an epoxide equivalent weight of 192 was fed continuously at an instantaneous rate of 13.0 gms./min., and combined with a continuous stream of molten bisphenol-A metered at 5.8 gms./min. The temperature of the combined streams was 159° C. Molten triphenylphoshine catalyst, at 112° C, was then added to the reactant material stream at a continuous rate of 0.0176 gms./min. Immediately following the catalyst addition the fluid mixture entered a two section continuous tubular reactor with in-line agitators or mixers. The first section consisted of a ¼ inch O.D., oil jacketed, Kenics Static Mixer$^{(R)}$ Module maintained at 164° C. The second section consisted of a 9.5 ft. section of ⅜ inch O.D. mixer modules connected in series and maintained at about 160° C. In the second section the materials reacted attaining a peak temperature of 241° C. The temperature declined to 174° C at the end of the reactor where the molten polymer was quenched to the solid state on a chilled metal collector surface. The nominal mean residence time for this run was 9 minutes. Similar procedure was used for runs IV-b to IV-g. Other data and results for runs IV-a to IV-g on the continuous unit are shown in Table II below.

bisphenol alone and then adding the polyepoxide. Bisphenol-A causes in this run a partial loss of activity. Epoxides will cause a total loss of activity if similarly contacted alone with the catalyst with subsequent addition of bisphenol-A. Indeed, in a test of triphenylphosphine mixed with a liquid diglycidyl ether of bisphenol-A at 30 minutes at 150° C, and in the absence of any added bisphenol-A, all catalytic activity was lost.

While triphenylphosphine is a preferred catalyst, as may be seen in the following examples, other catalysts well known to the art can be employed.

EXAMPLES V – VI

Example II was repeated except that equimolar amounts of the catalysts shown in Table III below were employed. Exotherms, times, and properties are shown in Table III.

TABLE III

| Example | II | V | VI | VII |
|---|---|---|---|---|
| Catalyst$^a$ | TPP | TBP | TOA | KOH |
| Parts by Weight | .1 | .08 | .27 | .03 |
| Peak Exotherm (° C) | 190 | 195 | 171 | 198 |
| Target WPE | 1025 | 1025 | 1025 | 1025 |
| Total Time (min) | 62 | 22 | 50 | 110 |
| Gross Initial Rate$^b$ | 55 | 39 | 21 | 9 |
| WPE | 1017 | 1039 | 1041 | 1125$^c$ |
| Aw | 155 | 162 | 158 | —$^c$ |
| An | 81.6 | 83.5 | 82.7 | —$^c$ |
| MWD | 1.9 | 1.9 | 1.9 | —$^c$ |

$^a$TPP = triphenylphosphine; TBP = tributylphosphine; TOA = trioctylamine; KOH = potassium hydroxide.
$^b$Value of least squares straight line slope with correlation coefficient >.95 for WPE vs time.
$^c$Catalyst incompletely solubilized. A constant WPE value was not achieved at the end of 110 minutes.

TABLE II

| Example IV | a | b | c | d | e | f | g |
|---|---|---|---|---|---|---|---|
| Polyepoxide$^{(1)}$ (gms./min.) | 13.0 | 13.1 | 13.2 | 13.6 | 13.1 | 13.1 | 13.0 |
| Bisphenol-A (gms./min.) | 5.82 | 5.25 | 5.59 | 5.59 | 5.95 | 5.82 | 5.95 |
| Triphenylphosphine (gms./min.) | 0.0176 | 0.0141 | 0.0169 | 0.0253 | 0.0178 | 0.0350 | 0.0178 |
| Initiation Temperature (° C) | 159. | 162. | 161. | 160. | 160. | 158. | 162. |
| Peak Exotherm Temperature (° C) | 241. | 237. | 236. | 241. | 228. | 230. | 227. |
| Target WPE (gm./gm. equiv.) | 1125. | 895. | 950. | 878. | 1133. | 1097. | 1216. |
| Actual WPE (gm./gm. equiv.) | 858. | 663. | 824. | 786. | 863. | 985. | 934. |
| Viscosity | 47. | 9.4 | — | 31. | 33. | 71. | 36. |
| An | 72.5 | 56.0 | 68.9 | 67.4 | 66.4 | 82.2 | 68.0 |
| Aw | 131. | 88.8 | 118. | 119. | 109. | 154. | 131. |
| MWD | 1.8 | 1.6 | 1.7 | 1.8 | 1.6 | 1.9 | 1.9 |
| Mean Residence Time (minutes) | 8.9 | 9.1 | 8.9 | 8.7 | 8.7 | 8.7 | 8.7 |

$^{(1)}$Epi-Rez 510 A liquid diglycidyl ether of bisphenol-A having an epoxide equivalent weight of 185-200.

As may be seen from the above, utilization of the present invention rapidly provides well-reacted products of relatively low viscosity. This low viscosity is a consequence of the relatively narrow molecular weight distribution, e.g., 1.6 – 1.9, which may be achieved by the present invention. The magnitude of this viscosity improvement is readily seen by comparing Example II with Comparative Run B. The two vary only 2% in WPE values but the resin of Comparative Run B has 1.8 times the melt viscosity of the resin of Example II.

Of particular value and novelty is the rapid reaction rate of the present invention which can be readily seen in FIG. 2 which shows the WPE values versus time curves for Examples I and III and Comparative Run A.

As shown by Example IV, this rapid rate makes the present invention well suited to continuous reaction giving a far shorter residence time than that taught by prior art.

Comparative Run C demonstrates the deactivating effect upon the phosphine catalyst of contacting it with The principles, referred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

We claim:

1. In a process for advancing the molecular weight of thermosetting resinous polyepoxides wherein a dihydric phenol and a resinous polyepoxide containing 1,2-epoxy groups are reacted in the presence of a catalyst to produce a molecular weight advanced thermosetting resinous polyepoxide, the improvement comprising, after a first catalytic amount of the catalyst is introduced into the mixture of the dihydric phenol and the polyepoxide and the reaction has been maintained for a first period of time sufficient to produce a molecular weight advanced polyepoxide, introducing a second catalytic amount of the catalyst into the mixture while at a reaction temperature to further advance the molecular weight of the polyepoxide the ratio of the first catalytic amount to the second catalytic amount constituting from about 10:1 to about 1:10.

2. A process according to claim 1 wherein the dihydric phenol is bisphenol-A, the resinous polyepoxide is a diglycidyl ether of bisphenol-A, and the catalyst is triphenylphosphine.

3. A process for advancing the molecular weight of thermosetting resinous polyepoxides which process comprises:
(A) providing a catalyst-free mixture of a dihydric phenol and a resinous polyepoxide containing 1,2-epoxy groups at a temperature of above about a minimum reaction temperature for a catalytic liquid advancement reaction between the dihydric phenol and the polyepoxide;
(B) subsequently introducing a first catalytic amount of an organic phosphine catalyst into the mixture of the dihydric phenol and polyepoxide at reaction temperature and maintaining the mixture containing the catalyst at reaction temperature for a first period of time sufficient to produce a molecular weight advanced thermosetting resinous polyepoxide; and
(C) introducing a second catalytic amount of the catalyst into said mixture while at reaction temperature to further advance the molecular weight of the polyepoxide the ratio of said first catalytic amount to said second catalytic amount constituting from about 10:1 to about 1:10.

4. A process according to claim 3 wherein the dihydric phenol is bisphenol-A and the resinous polyepoxide is a diglycidyl ether of bisphenol-A.

5. A process for advancing the molecular weight of thermosetting resinous polyepoxides, which process comprises:
(A) heating a catalyst-free mixture of (i) a dihydric phenol of the structural formula:

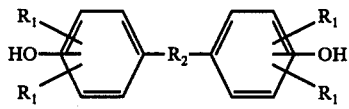

wherein $R_1$ is independently selected from the group consisting of H, Cl and Br, and $R_2$ is selected from the group consisting of a divalent bond, a divalent hydrocarbon radical of from 1 to 10 carbon atoms,

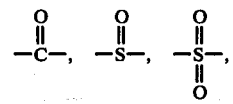

—S—, —S—S— and —O—; and (ii) a resinous polyepoxide consisting essentially of an aromatic polyepoxide of the structural formula:

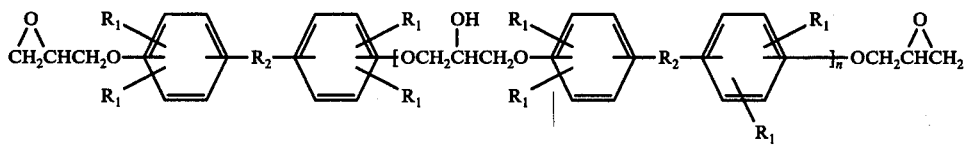

wherein $R_1$ and $R_2$ are independently selected from the respective groups above and wherein $n$ has an average value between zero and about 10;
to a temperature of above a minimum reaction temperature for the organic phosphine-catalyzed liquid advancement reaction between the dihydric phenol and the aromatic polyepoxide;
(B) thereafter admixing a first catalytic amount of the organic phosphine catalyst with the mixture of dihydric phenol and aromatic polyepoxide at reaction temperature and maintaining the mixture containing the catalyst for a first period of time sufficient to produce a molecular weight advanced thermosetting resinous polyepoxide of the structural formula in (ii) above except the average value for $n$ has been raised by at least about 2; and
(C) introducing a second catalytic amount of said catalyst into said mixture while at reaction temperature to further advance the polyepoxide, the ratio of said first catalytic amount to said second catalytic amount constituting from about 10:1 to about 1:10.

6. A process for advancing the molecular weight of thermosetting liquid resinous polyepoxides, which process consists essentially of the sequential steps of:
(A) heating under agitation a catalyst-free mixture of bisphenol-A and a liquid resinous polyepoxide consisting essentially of a polyepoxide of the structural formula:

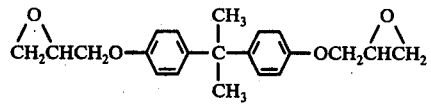

to a reaction temperature of above 120° C and for a time sufficient to obtain a substantially homogeneous solution wherein the bisphenol-A is substantially completely dissolved;
(B) admixing the solution of a reaction temperature above 120° C with a first catalytic amount of triphenylphosphine and maintaining the admixture at reaction temperature for a first period of time sufficient to produce a molecular weight advanced thermosetting resinous polyepoxide;
(C) introducing a second catalytic amount of triphenyl phosphine and maintaining the reaction temperature for a second period of time sufficient to produce a further molecular weight advanced thermosetting resinous polyepoxide consisting essentially of a polyepoxide of the structural formula:

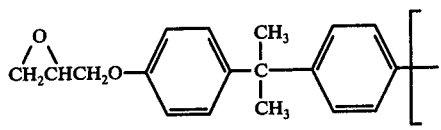

wherein *n* has an average value between 4 and about 6 the ratio of said first catalytic amount to said second catalytic amount constituting from about 10:1 to about 1:10.

7. A process for advancing the molecular weight of thermosetting liquid resinous polyepoxides, the process including:

(A) providing a catalyst-free mixture of bisphenol-A which is in the molten state and a liquid resinous polyepoxide consisting essentially of a polyepoxide of the structural formula:

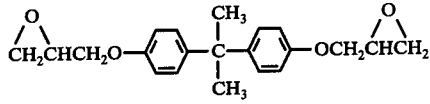

at a reaction temperature of about 160° C;

(B) thereafter admixing a first catalytic amount of triphenylphosphine with the mixture of bisphenol-A and the polyepoxide and maintaining the mixture containing the catalyst at a reaction temperature above 160° C for a first period of time sufficient to produce a molecular weight advanced thermosetting resinous polyepoxide;

(C) admixing a second catalytic amount of triphenylphosphine catalyst into the mixture the ratio of said first catalytic amount to said second catalytic amount constituting from about 10:1 to about 1:10 while at reaction temperature for a second period of time sufficient to produce a further advancing of the molecular weight of the thermosetting resinous polyepoxides consisting essentially of an aromatic polyepoxide of the structural formula:

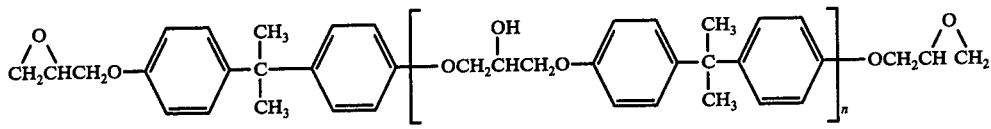

8. A continuous process for advancing the molecular weight of liquid resinous polyepoxides, which process consists essentially of:

(A) passing catalyst-free bisphenol-A through a first zone to heat the bisphenol-A to a temperature between about 160° C and 180° C, the bisphenol-A being in a molten state upon emerging from the first zone;

(B) passing catalyst-free liquid resinous polyepoxide consisting essentially of a polyepoxide of the structural formula:

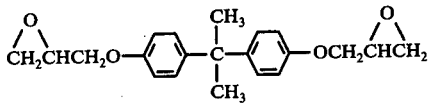

through a second zone to heat the liquid resinous polyepoxide to a temperature between about 120° and about 220° C;

(C) in a third zone downstream of the first and second zones, admixing the bisphenol-A and the liquid resinous polyepoxide to provide a catalyst-free mixture of bisphenol-A and the polyepoxide at a temperature between about 120° C and 220° C;

(D) in a fourth zone downstream of the third zone, admixing the catalyst-free mixture of bisphenol-A and polyepoxide at a reaction temperature above 120° C with a first catalytic amount of triphenylphosphine and maintaining the admixture at a reaction temperature between about 120° C and about 250° C for a first period of time sufficient to provide a molecular weight advanced thermosetting resinous polyepoxide;

(E) admixing said mixture with a second catalytic amount of said catalyst, the ratio of said first catalytic amount to said second catalytic amount constituting from about 10:1 to about 1:10, for a second period of time sufficient to produce a further molecular weight advanced thermosetting resinous polyepoxide consisting essentially of a polyepoxide of the structural formula:

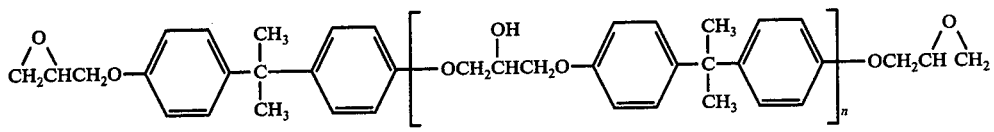

wherein *n* has an average value between about 4 and about 6, and wherein the molecular weight advanced resinous polyepoxide has a weight per epoxide value of from about 600 to about 1000 and a molecular weight distribution value between about 1.6 and about 1.9; and (F) recovering the molecular weight advanced thermosetting polyepoxide product.

9. A process according to claim 5 wherein in step (A) the catalyst-free mixture is heated to a temperature between about 120° C and about 200° C and in step (B)

and (C) therein the reaction temperature is between about 120° C and about 250° C.

10. A process according to claim 5 wherein the organic phosphine catalyst comprises triphenylphosphine.

11. A process according to claim 6 wherein the dihydric phenol is in the molten state prior to the first addition of the catalyst to the mixture, the liquid resinous aromatic polyepoxide has a weight per epoxide value of between about 170 to about 290, and wherein the molecular weight advanced resinous polyepoxide has a weight per epoxide value of between about 700 and about 1000 and a molecular weight distribution of about 1.6 to about 1.9.

12. A process according to claim 7 wherein the liquid resinous aromatic polyepoxide has a weight per epoxide value of between about 170 and about 290, and wherein the reaction temperature is between about 160° C and about 240° C.

* * * * *